United States Patent [19]

Bourcier et al.

[11] Patent Number: 5,133,505
[45] Date of Patent: Jul. 28, 1992

[54] SEPARATION OF ALUMINUM ALLOYS

[75] Inventors: Gilbert F. Bourcier, Midlothian; Jack Lowdon, Richmond, both of Va.

[73] Assignee: Reynolds Metals Company, Richmond, Va.

[21] Appl. No.: 606,634

[22] Filed: Oct. 31, 1990

[51] Int. Cl.$^5$ ............................................. B02C 23/00
[52] U.S. Cl. ...................................... 241/19; 241/20; 241/24; 241/79.1; 241/99; 209/3; 209/12; 209/38; 209/40; 209/212
[58] Field of Search ..................... 241/19, 20, 24, 79.1, 241/99; 209/3, 12, 38, 40, 212

[56] References Cited

U.S. PATENT DOCUMENTS

| | | | |
|---|---|---|---|
| 3,817,458 | 6/1974 | Gilberto | 241/79.1 X |
| 4,119,453 | 10/1978 | Knezevich | 241/73 X |
| 4,137,156 | 1/1979 | Morey et al. | 209/227 X |
| 4,330,090 | 5/1982 | Montagna et al. | 241/14 |
| 4,387,019 | 6/1983 | Dale et al. | 209/38 X |
| 4,459,206 | 7/1984 | Laithwaite | 241/79.1 X |
| 4,468,847 | 9/1984 | Bowman et al. | 241/14 X |
| 4,491,473 | 1/1985 | Bowman et al. | 241/14 |
| 4,498,523 | 2/1985 | Bowman et al. | 241/23 X |
| 4,553,703 | 11/1985 | Villarreal | 241/24 |
| 4,592,511 | 6/1986 | Bowman | 241/14 |
| 4,830,188 | 5/1989 | Hannigan et al. | 241/24 X |
| 4,842,721 | 6/1989 | Schloemann | 209/212 |
| 5,060,871 | 10/1991 | Brassinga et al. | |

FOREIGN PATENT DOCUMENTS 0307250  3/1989  European Pat. Off. .

OTHER PUBLICATIONS

PACE GRAVITY SEPARATOR Model T-15, Triple/S Dynamics, Inc., PB 23 6/91-1M.
ROTASCREEN TROMMELS, Triple/S Dynamics, Inc.—PB-16-4/90-2M.
TEXAS SHAKER SUPER SCREENERS, Triple/S Dynamics, Inc., PB-18-10/90 3M.
DRY SEPARATIONS FOR THE PROCESSING INDUSTRIES, Triple/S Dynamics, Inc., PB 22-8/-91-5M.
"Recycle and Secondary Recovery of Metals", Patrick R. Taylor, Hong Y. Sohn and Noel Jarrett, The Metallurgical Society of AIME, Dec. 1-4, 1985.

Primary Examiner—Mark Rosenbaum
Assistant Examiner—Frances Chin
Attorney, Agent, or Firm—Alan M. Biddison

[57] ABSTRACT

A method and an apparatus for separating shredded particles, for instance particles of used beverage cans, into respective fractions that contain greater amounts of one of a plurality of alloys from which the cans have been made. The method includes screening the shredded material to provide particles having a desired particle size, and gravimetrically separating the screened particles into a plurality of groups based upon the mass of the particles. The heaviest bulk density group of particles is selected for further processing and is first preferably passed through a flattening device to flatten the particles, which are then conveyed through a varying magnetic field provided by a linear induction motor so that the particles containing higher concentrations of higher conductivity alloys can be further separated from particles of alloys having lower electrical conductivities. The highest conductivity fraction that results includes a high concentration of can body alloy, which can then be recycled as scrap material for further processing into can body alloy material. The other fraction of material, depleted of the can body alloy, can be more readily used in the manufacture of new can end material.

21 Claims, 1 Drawing Sheet

SEPARATION OF ALUMINUM ALLOYS

BACKGROUND OF THE INVENTION

1. Field of the Invention

The present invention relates to a method and an apparatus for the separation of mechanically connected parts made from different aluminum alloys, and more particularly to a method and an apparatus for separating the aluminum alloys that are commonly used to make aluminum alloy can ends from the aluminum alloys commonly used to make can bodies.

2. Description of the Related Art

In ever-increasing quantities, cans, including beverage cans, are being made from aluminum alloys because of the ease with which such materials can be formed into containers, and also because the lighter weight of these containers reduces shipping costs. One of the principal applications of aluminum alloy cans is for use as beverage containers. Typically, such beverage cans are of the usual cylindrical configuration having both top and bottom ends and a cylindrical body or sidewall.

The most prevalent process for forming such cans involves providing a disk-shaped blank of aluminum alloy that is deep drawn with a suitable pressing die to provide a can body open at one end and having a thin, cylindrical sidewall integrally connected with a thicker bottom end. The sidewall and bottom end are therefore made from the same material, which is generally Aluminum Association alloy number 3104 (AA3104).

The top ends of such aluminum alloy cans are separately formed from an aluminum alloy, typically Aluminum Association alloy number 5182 (AA5182), having a different chemical composition and different physical properties from that of AA3104. Further, the usual ring tabs and stay-on tabs for providing a dispensing opening to permit use of the contents of the can are typically also made from an Aluminum Association 5000-series alloy.

With the increasing emphasis upon preservation of the environment by the recycling of materials, there is strong support for recycling of plastic, glass, and metallic packaging materials, including used aluminum beverage cans (UBC's). However, because of the different aluminum alloys that are employed in making different parts of such cans, simply melting entire aluminum UBC's will provide a resulting material that lacks the desirable individual properties from which the parts of the original can were formed. Consequently, it is desirable that the can body alloys and the can end alloys be separated, to preserve as much as possible of the original alloy composition for use as scrap material to be added to virgin material for reuse. Otherwise, the melting of entire cans would require excessive subsequent modification of the resulting molten metal, such as, for example, the addition of primary aluminum metal to lower the percentage amounts of other alloying materials present, and the addition of other alloying elements necessary to provide a alloy having the desired composition and physical characteristics.

Various approaches have been suggested to permit the separation of different alloys from UBC's. For example, in U.S. Pat. No. 4,468,847, which issued on Sep. 4, 1984, to Kenneth A. Bowman et al., a method is disclosed for segregating metallic components of UBC's. The method includes first separating foreign materials, such as dirt, sand, coating materials, and the like. The resulting aluminum alloy UBC's are then heated to a temperature that is below the melting point of each of the alloys but that is sufficient to cause incipient melting of the lowest melting temperature component. While at that incipient melting temperature, the cans are agitated to cause fracture at the grain boundaries of the lower melting point alloy and thereby separate, by screening, the fragments of this lower melting point alloy from the remainder of the cans. However, the requirement to heat the cans requires large heating facilities, involves high energy costs, and results in excessive oxidation of the fragments.

Additional methods that also include heating of cans to the lowest incipient melting temperature component are disclosed in U.S. Pat. Nos. 4,491,473; 4,498,523; 4,592,511; in each of which Kenneth A. Bowman is designated either as sole or as a joint inventor.

Other methods proposed for the separation of aluminum alloys include that disclosed in U.S. Pat. No. 4,330,090, which teaches the separation of wrought and cast aluminum materials by heating a mixture of such materials to a temperature above the solidus temperature of the cast aluminum material, crushing the material to fragmentize the cast aluminum, and screening the crushed material to separate the cast aluminum from the wrought aluminum.

Additionally, U.S. Pat. No. 4,119,453 teaches a method for separating from waste material malleable metals, such as copper, aluminum, or the like, and also plastic materials, by grinding the materials to a predetermined size and then impacting the materials to form the malleable materials into spheroids that are subsequently separated by conventional separation devices.

It is an object of the present invention to provide an improved process for the separation from scrap aluminum beverage cans of the different aluminum alloys used to make parts of the cans.

It is a further object of the present invention to provide a method for separating fragments of aluminum alloy beverage cans that does not require the heating of the cans.

It is a still further object of the present invention to provide a method for the continuous separation of physically connected aluminum alloys at lower cost than previously-used methods.

SUMMARY OF THE INVENTION

Briefly stated, in accordance with one aspect of the present invention, a method and apparatus are provided for separating mechanically joined aluminum alloys contained in solid articles, such as used beverage containers, the alloys each having different electrical conductivity values. The method includes first shredding the solid articles or cans to provide a feedstock of metallic particles wherein the particles include at least one of the alloys. The feedstock is then mechanically separated into different groupings by particle size. The separated particles of a predetermined size are then subjected to a linear induction motor magnetic field to displace the particles linearly from a starting point, the displacement distance being dependent upon the electrical conductivity of the materials in the particles. Groups of the displaced particles are collected, based upon the distance they are displaced from the starting point, to provide groups of particles having different concentrations of the aluminum alloys.

DESCRIPTION OF THE PREFERRED EMBODIMENTS

Figure 1:
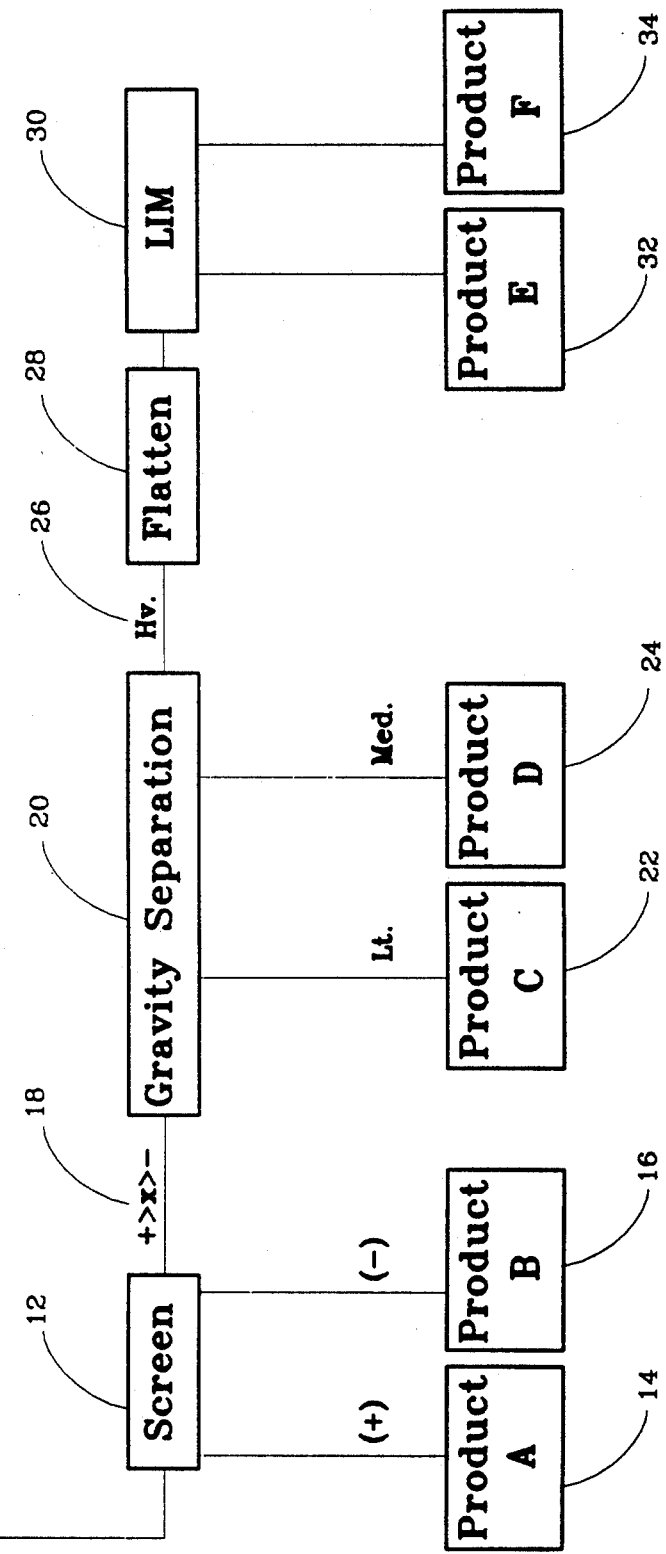
FIG. 1 is a flow chart in block diagram form of the several steps of the present method and apparatus showing the physical treatment to which the starting material is subjected to separate the several aluminum alloys that it contains.

Although the invention will be described in connection with its use for separating aluminum alloys contained in aluminum beverage cans, the method and apparatus are applicable to the separation of physically separated alloys, mixed together, or to physically connected aluminum alloys contained in other types of starting materials. In that regard, by "physically connected" is meant discrete alloys of particular composition that are joined together mechanically, rather than chemically.

Although the sidewall and the bottom wall of most aluminum beverage cans are made from the same material in a deep drawing process, the thicknesses of the several parts of the can body vary substantially. The bottom wall of the can, because of the nature of the deep drawing process, is generally the same thickness as that of the blank that is used to form the body, and is typically in the range of approximately 0.012 inches for cans in the 12 oz. (355 ml.) capacity range. The portion of the sidewall adjacent the bottom wall is the same as the thickness of the bottom wall, and the sidewall thickness tapers over approximately 0.375 inches to a lesser thickness of approximately 0.0043 inches. The middle portion of the sidewall, having a length of approximately 3.5 inches, has a substantially uniform thickness of about 0.0043 inches. Finally, the top 0.75 to 1.0 inches of the sidewall is thickened to approximately 0.0065 inches and flanged to facilitate connection of the can body to the can top. One thousand of the formed, washed, and trimmed can bodies that are so formed by the drawing operation weigh approximately 27 pounds. Of that weight, approximately 8.5 to 9 pounds (31.5% to 33.3%) is in the bottom end and the lowermost, tapered portions of the sidewalls. Approximately 12 pounds (44.4%) of the weight of the can bodies is the thin, 0.0043 inch sidewalls. The remainder of the drawn can body weight, approximately 6 pounds (22.3% to 24%) is in the flanged or thickened upper portion of the sidewalls.

The tops, or ends, are generally made from a different aluminum alloy and have a thickness of approximately 0.011 inches. One thousand of such ends have a weight of about 7.7 pounds when they are of a size adapted to be used with the can bodies described above. Additionally, ring tabs and stay-on tabs are typically made from an AA5000 series alloy. Typically, a complete can of 12 oz. capacity has a top amounting to about 25% of the total weight of the package, with the body accounting for the remaining 75%.

Table I below sets forth the chemical composition, by weight percent, of the typical can end and can body alloys, as specified by the Aluminum Association. The composition values are maximum values unless specified as ranges.

TABLE I

|    | AA3104 | AA5182 |
| --- | --- | --- |
| Si | 0.6 | 0.20 |
| Fe | 0.8 | 0.35 |
| Cu | 0.05–0.25 | 0.15 |
| Mn | 0.8–1.4 | 0.20–0.50 |
| Mg | 0.8–1.3 | 4.0–5.0 |
| Zn | 0.25 | 0.25 |
| Cr | — | 0.10 |
| Ga | 0.05 | — |
| V | 0.05 | — |
| Ti | 0.10 | 0.10 |
| Al | balance | balance |

In the reclaiming and recycling of aluminum UBC's, normally an initial step in the process involves some form of magnetic separation step to remove magnetically susceptible materials, such as steel cans, bimetallic cans, and other magnetic metallic materials that would contaminate the recycled material. After the magnetic separation step, the resulting material is shredded to recover most of it in a typical sieve size (US Standard) range of ¾"–1".

In the present invention, the shredded aluminum cans from which magnetic materials have been removed constitute the starting material 10 as shown in FIG. 1. The shredded starting material undergoes a screening step 12 to segregate the starting material into groups of predetermined particle sizes. In the screening operation an oversize fraction of the starting material is removed and processed as Product A, designated as step 14 in FIG. 1. The undersized fraction of the starting material is removed and processed as Product B in step 16 of FIG. 1. The remaining fraction 18, which has a particle size smaller than that of Product A and larger than that of Product B, is subjected to further processing in accordance with the present invention.

Product A, the oversized fraction, can contain contaminants in the form of sand, dirt, coatings, and other non-ferrous metals, as well as improperly shredded cans. This fraction can optionally be recycled through another shredding operation, or it can be used to make an alloy other than those of interest, or it can be used for another purpose.

Product B, the undersized fraction contains a larger share of contaminants in fine particle form, and also generally contains more can body fragments (AA3104 alloy) than can end fragments (AA5182 alloy). Consequently, Product B can advantageously be employed for further processing to make can body alloy.

The screening operation can be performed with a conventional typical screening machine, one example of which is a low speed oscillating machine, commercially known as a "Texas Shaker." That machine is described in a book entitled, "Screening Technology Handbook" by James F. Sullivan, which was copyrighted by Triple/S Dynamics Inc. in 1975. In the present invention the remaining fraction 18 is preferably between ⅜" and 2", whereas Product A, the oversized fraction, includes particles having sizes larger than 2 inches, and Product B, the undersized fraction includes particles having a size less than ⅜ inches. Surprisingly, it was discovered that a screen having round, or circular, openings was found to function better than a screen with rectangular openings in that it clogged less quickly than a rectangular screen and the sizing of the materials passing through the screen was more precise. Consequently, screens having round openings are preferred.

Intermediate size fraction 18, from screening machine 12, is further processed to segregate the screened particles into groups containing larger amounts of the respective alloys in the screened material. In that regard, such further processing can be carried out in a fluidized bed gravity separator 20, one example of which is generally known as the "Sutton-Steele PAC Gravity Separator," distributed by Triple/S Dynamics Company, of 1031 S. Haskell Avenue, Dallas, Tex. 75223. The Triple/S Model T-15 was found to be suitable, although other models are also available, each having different throughput capacities.

Gravity separator 20 divides the intermediate size fraction 18 into a first, or light weight component 22 designated Product C, a second, intermediate weight component 24 designated Product D, and a third, heavy weight component 26. The output of gravity separator 20 can be adjusted so that the proportions classified as light, medium, and heavy can be varied depending on factors such as the composition of the intermediate size fraction 18, the desired purity of the classified materials, the uniformity of the material being processed, and the desired throughput. Additionally, it is also possible to have only two classifications of output material, or to have more than three classifications.

Because the sidewalls of aluminum cans are significantly thinner than the top and bottom walls, Product C, the light weight fraction, tends to have a large concentration of can body alloy AA3104. Product D, the medium weight fraction, typically has about the same composition as that of intermediate size fraction 18, and can optionally be recycled through gravity separator 20 to further conduct the separation process for that product.

Tests performed on aluminum alloy cans that were shredded and screened to provide an intermediate size fraction between $\frac{7}{8}$" and 2", and that were processed through a Model T-15 gravity separator in accordance with the present invention provided output products having the characteristics shown in Table 2 below, wherein the percentages of AA3104 and of AA5182 are based upon the weight percentages of manganese in the respective outputs. (Typically, a 12 oz. aluminum beverage can consists of 75% body alloy and 25% end alloy, with a manganese content in the range of 0.85% to 0.90% after melting.)

ing of the gravity separator. In that regard, the gravity separator previously identified uses three principal mechanisms for separation: fluidization, which is the stratification of materials in a rising current of air, vibration, and gravity. The separator responds to differences in particle density, size, and shape so that if any two of those factors are controlled within certain limits, the third factor will govern the separation. In a preferred embodiment, the separator separates the feedstock particles into fractions having predetermined sizes and bulk densities.

The separation is effected on a porous deck of perforated metal or other suitable material. The mixture to be separated is first elutriated and stratified by air blown upwardly through the openings in the deck from an air supply system associated with the separator The heavier particles sink to the bottom of the fluidized material bed and are deposited on the deck surface. A straight-line vibrating motion is imparted to the deck by an eccentric drive and carries the heavier materials away from the lighter materials, which float in the upwardly-directed air stream. Additionally, the deck is sloped in two directions, from feed at the front end to the discharge at the back end and also from side to side, so that the lightest particles slip down to the lower discharge corner. The heaviest particles are conveyed up the slope and forced off the deck at its upper side. Particles of intermediate weight are discharged between the two sides. The separator thus produces an output having a continuous bulk density spectrum at the discharge of the deck, the spectrum varying from light to heavy. Additionally, a vacuuming hood is preferably positioned over the deck surface to remove scrap paper, dust, and other lightweight materials present that might contaminate the scrap being processed.

It has been observed that the physical features and chemical analysis of samples taken along the discharge ramp of the gravity separator reveal the lightweight component 22 to include mostly can sidewall alloy AA3104, in the amount of more than 90%. Further, at the opposite, or higher side of the discharge ramp the chemistry and appearance of the separated material are vastly different. At the higher side, there is very little decorated material, and the heavy weight component has the appearance of being mostly can top or bottom walls, and having about twice the bulk density of light weight component 22. Further, chemical analysis of the heavy weight component 26 confirms that composition,

TABLE 2

| | GRAVITY SEPARATOR SYSTEM OUTPUT PRODUCTS - QUANTITY AND QUALITY* | | | | | | | |
|---|---|---|---|---|---|---|---|---|
| | $-\frac{7}{8}$" | | Lights | | Mids | | Heavies | |
| Test Period | % of Input | % 3104 | % of Input | % 3104 | % of Input | % 3104 | % of Input | % 3104 |
| 72 Runs | | | | | | | | |
| Mean | 15 | 93 | 36 | 90 | — | — | 46 | 69 |
| Range | 6–21 | 87–100 | 18–53 | 81–100 | — | — | 27–68 | 60–76 |
| 22 Runs | | | | | | | | |
| Mean | 13 | 89 | 16 | 97 | 27 | 75 | 41 | 66 |
| Range | 10–15 | 83–97 | 8–25 | 95–100 | 11–39 | 73–80 | 27–50 | 63–70 |
| 36 Runs | | | | | | | | |
| Mean | 14 | 90 | 15 | 97 | 33 | 76 | 36 | 65 |
| Range | 8–27 | 82–100 | 3–28 | 92–100 | 20–47 | 65–86 | 23–55 | 52–77 |
| 9 Runs | | | | | | | | |
| Mean | 14 | 89 | 12 | 96 | 40 | 75 | 32 | 65 |
| Range | 9–21 | 82–96 | 7–16 | 93–100 | 30–48 | 66–83 | 27–48 | 59–69 |

*For this table, %5182 = 100% − %3104

The output from the gravity separator can have a range of bulk density, typically from about 10 lb./ft.$^3$ to about 20 lb./ft.$^3$, distributed along the discharge openby analysis of the percentage manganese present, indicating a mixture that is equivalent to about ⅓ can body alloy AA3104 and ⅔ can end alloy AA5182. Consequently, the heavy weight component 26 represents a product having about a 50% increase in the concentration of can end alloy AA5182 a compared with that of the starting material 10. Finally, the medium weight component 24 has about the same physical and chemical composition as that of intermediate size fraction 18.

After separation from intermediate size fraction 18 in gravity separator 20, heavy weight component 26 is further treated by passing it through a conventional flattener 28 to provide a more uniform scrap particle thickness.

The electrical conductivity of can body alloy AA3104 is about 39% IACS, while the electrical conductivity of can end alloy AA5182 is about 29% IACS, the former having a conductivity approximately 30% greater than that of the latter. That difference in electrical conductivity is utilized in a further separation step carried out in a linear induction motor (LIM) 30 that provides a moving magnetic field that causes particles of material within the field to be propelled in the direction of the field by a force that is dependent upon the electrical conductivity of the particles. Thus, particles having a higher electrical conductivity are propelled a greater distance than are material shaving a lesser electrical conductivity. That phenomenon is utilized to effect further separation of heavy weight component 26.

The construction of linear induction motors is well known, and descriptions of the structure and operation of such devices are provided in U.S. Pat. Nos. 4,137,156 and 4,459,206, the disclosure of each of these patents is hereby incorporated by reference herein to the same extent as if fully set forth. Preferably, a generally planar conveyor belt moving in a generally horizontal plane is provided to transport the flattened heavy weight components 26 from flattener 28 to LIM 30, which can have its operative components both above and below the conveyor belt and positioned close to the output end of the belt so that the thrust forces imparted by the LIM are oriented parallel to the direction of movement of the conveyor. In that orientation of the LIM, the particles of component 26 having the highest conductivity are displaced a greater distance from the end of the belt and are collected as Product F in step 34, with the remainder 32 of the particles forming an additional remainder fraction designated as Product E.

Presented below in Table 3 are the characteristics of the feed stocks used for LIM testing. The mids weight and heavies weight fractions were screened to provide material of controlled dimensions so that LIM sensitivity could be at a maximum.

TABLE 3
FEEDSTOCKS FOR LIM TESTING

| | Raleigh Shredded UBC's Base Line:* | |
|---|---|---|
| Lights | 19.7% of input UBC | 98% 3104 |
| Mids | 32.5% of input UBC | 78% 3104 |
| Heavies | 29.3% of input UBC | 66% 3104 |

| Screen Analysis - As Received From Shredder | |
|---|---|
| −⅛" (Pan) | 21% |
| −¼" +⅛" | 13.5% |
| −⅜" +¼" | 38% |
| −1" +⅜" | 16% |
| −1¼" +1" | 7.9% |
| −1½" +1¼" | 2.8% |
| +1½" | 1.2% |

| | Screen Analysis and Chemistry - T-15 Outputs | | | | | |
|---|---|---|---|---|---|---|
| | Mids | | | Heavies | | |
| | % Mids | % 3104 | % 5182 | % Heavies | % 3104 | % 5182 |
| −⅜" | 2.5 | 85% | 15% | 2% | 64% | 36% |
| −¾" +⅜" | 52 | 64.7 | 35.3 | 47 | 47 | 53 |
| −1" +¾" | 32 | 68.7 | 31.3 | 31.5 | 67.9 | 32.1 |
| +1" | 13.5 | 84.1 | 15.9 | 19 | 78.3 | 21.7 |

*−1", +2", and cyclone dust comprise the remaining 18.5% of the UBC's in this test.

A typical output distribution from the LIM is presented in Table 4, which shows the relative percentages of can end and can body alloys in each of Products E and F.

TABLE 4

| | LIM OUTPUTS[1] | | | | | |
|---|---|---|---|---|---|---|
| | PRODUCT E - 5182 ENRICHED FRACTION | | | PRODUCT F - 3104 ENRICHED FRACTION | | |
| | % of Input Screen Fraction | %3104 | %5182 | % of Input Screen Fraction | %3104 | %5182 |
| Mids Input | | | | | | |
| −⅜" | (Not Processed on LIM) | | | | | |
| −¾" +⅜" | 55.5% | 63.9% | 36.1% | 44.8% | 80.9% | 19.1% |
| −1" +¾" | 18 | 64.5 | 35.5 | 82 | 69.4 | 30.6 |
| +1" | 13 | 64.3 | 35.7 | 87 | 70.8 | 29.2 |
| Heavies Input | | | | | | |
| −⅜" | 94% | 54.7% | 45.3% | 6% | 63% | 37% |
| −¾" +⅜"(2) | 49.5 | 43.7 | 56.3 | 50.5 | 54.8 | 45.2 |
| −1" +¾" | 24.3 | 53.3 | 46.7 | 75.7 | 67 | 33 |
| +1" | 8.3 | 62.1 | 37.9 | 91.4 | 79.7 | 20.3 |

Input Mids Baseline: 78% 3104, 22% 5182
(From Table 3 - 32.5% of UBC's)
Input Heavies Baseline: 66% 3104, 34% 5182
(From Table 3 - 29.3% of UBC's)
[1]Data presented are condensed from LIM tests conducted on a large quantity of material in 1/16 screen size increments, from ⅛" to 1¼". The dividing line between 5182 enriched (product) and 3104 enriched material (tailings) was 22" horizontally from the edge of the LIM. Material ejected further than 22" consisted of more and higher conductivity 3104.
[2]For the −¾" +⅜" heavies fraction, the large quantity of lower conductivity tear tabs/ring tabs present in that screen fraction reacted (due to their geometry) with the LIM field and were ejected further than 22". In plant operations this screen size material would probably bypass a LIM system and go directly to 5182 production.

As is apparent from Table 4, Product F contains a larger fraction of the higher electrical conductivity alloy, can body alloy AA3104, which can be used directly as a scrap fraction that could be added to a melt of can body alloy for recycling. In that regard, the proportion of the output collected as Product F is influenced by several factors such as the desired purity of the product, the characteristics of the materials being processed, the desired throughput, and the LIM design. As can be noted in Table 4, the LIM output represents an increase in end alloy E content of more than 30% over the input material 26.

Optionally, if desired, Produce F can be recycled through the LIM to further subdivide it and thereby provide a higher concentration of body alloy scrap. Similarly, Product E could, if desired, be further recycled to provide a product having a greater concentration of can end alloy. Additionally, further refinement of Product E material can be effected by passing the flattened material in a roll flattener in which each of the rolls rotates at a different speed, with the result that some of the can end fragments that are connected to can body fragments are physically removed from each other to increase the end alloy content when the so-treated Product E fraction is recycled through the LIM.

In addition to orienting the magnetic field of the LIM so that the force lines are aligned with the direction of movement of the conveyor belt that carries the fattened particles, if desired, the magnetic field can be oriented so that the force liens are positioned at an angle to the conveyor belt direction in order to eject the higher conductivity particles from the side of the conveyor belt for collection. In a still further orientation, the magnetic field direction could be oriented at an angle to the belt direction ranging up to 90° from the horizontal, with the material to be separated either carried on a conveyor belt, or dropped into a gap between two LIMs. Finally, other LIM system designs can make use of only one LIM, either above or below the belt, or one LIM below the belt and a steel plate "back iron? directly above the belt. The function of the "back iron" is to contain the magnetic field at a distance from the pole surfaces, as in a magnetic keeper.

As a further example, the system in accordance with the present invention can be operated so that approximately 20% to 40% of the input of the gravity separator is classified as Product C and contains about 90% AA3104 and 10% AA5182. The remaining 60% to 80% of the input would be classified as heavy fraction 26, with about 65% (40%-50% of input) alloy AA3104 and 35% (20%-30% of input) alloy AA5182.

Several observations can be made based upon pilot scale tests conducted in accordance with the present invention as hereinabove described. First, in one experiment Product C of the gravity separation process contained the equivalent of 90% AA3104 and 10% AA5182, based upon the chemistry of the product. This demonstrated the capability of removing thinner sidewall fragments from the thicker gauge bottom and end fragments, which resulted in a more homogeneous mixture being fed to the LIM and made it possible to maximize the selectivity of the LIM based upon the approximately 30% difference in electrical conductivity between AA3104 and AA5182. Second, in another experiment it was possible to have Product C contain almost 100% AA3104 by adjusting the amount of the output of the separator classified as light weight material. Up to about 30% of the input shreds could be classified as light weight materials without significantly affecting the concentration of AA3104 in that light weight fraction.

Similarly, the AA5182 content of the second remainder fraction 26 can be increased by increasing the quantity of material diverted to the other products. Thus, increasing the purity results in a decrease in the total amount of material diverted to a particular category.

Another advantage provided by the present invention is the possibility of reducing the amount of primary ingot that must be added when shredded cans are melted to make AA5182. When a normal mixture is melted it contains about 0.85% manganese by weight. Since AA5182 has a nominal manganese level of about 0.35% by weight, about twice as much primary ingot as scrap is required to obtain the correct manganese level in the desired product. The amount of primary ingot required, as well as the amount of magnesium and other alloying elements, is reduced as the amount of AA5182 in the scrap is increased.

The present apparatus and method can also be used to separate other alloys of the same general family from each other. The characteristics of the starting materials, such as particle size distribution, differences in density, and flatness, would determine the need for screening, gravity separation, and flattening prior to feeding the materials to the LIM. For instance, the LIM could be used to separate aluminum-lithium alloys from other aluminum alloys used for making aircraft parts, or, alternatively, the method could also be used to separate particles of other metals or metallic alloys from each other. The essential distinction between the metal or alloy desired and the other metals or metallic alloys mechanically mixed with the desired metallic material is that there be a difference in the electrical conductivities of the respective metals and metallic alloys, so that the magnetic field provided by the linear induction motor displaces the metallic particles different distances, dependent upon their electrical conductivities. The desired metallic particles can then be segregated from the collected groups of metallic particles that are provided by the displacement by the magnetic field.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A method for separating aluminum can ends mechanically joined to aluminum can bodies, the ends and bodies being made from alloys each having different electrical conductivity values, said method comprising:
   a. shredding the aluminum can to provide a feedstock of metallic particles wherein the particles include at least one of the alloys;
   b. separating from the feedstock a first group of metallic particles having a predetermined particle size and a concentration of can end particles greater than the concentration in the feedstock;
   c. separating from the first group of metallic particles a plurality of second groups of metallic particles, each of said second groups having a predetermined different range of bulk density and a concentration of can end particles different from the concentration in the feedstock;

d. subjecting the particles in at least one of said second groups to a magnetic field of a linear induction motor to displace the particles linearly from a starting point a distance dependent upon the mass of the particles and upon the electrical conductivities of the materials in the particles; and e. collecting a plurality of third groups of the displaced particles based upon their displacement from the staring point to provide groups of particles having different concentrations of can end particles and can body particles, the concentration of can end particles in at least one of said third groups being greater than the concentration of can end particles in said at least one of said second groups.

2. A method in accordance with claim 1 including the step of flattening the separated particles before subjecting them to the magnetic field.

3. A method in accordance with claim 1 including the step of magnetically separating magnetically susceptible materials before the particle separation step.

4. A method in accordance with claim 1 wherein the separating step includes physically screening the feedstock particles to classify the particles into a plurality of particle sized groups.

5. A method in accordance with claim 4 including the step of selecting a particle size group and the further step of gravimetrically performing a further separation of the particles in the selected particle size group to provide a plurality of particle size fractions.

6. A method in accordance with claim 5 wherein the gravimetric separation step includes providing a fluidized bed into which the selected particle size group is introduced.

7. A method in accordance with claim 1 wherein the separated particles of predetermined size are conveyed along a conveyor in a conveying direction and the magnetic field is aligned with the conveying direction to displace particles in the conveying direction.

8. A method in accordance with claim 1 wherein the separated particles of predetermined size are conveyed along a conveyor in a conveying direction and the magnetic field is oriented at an angle to the conveying direction to displace materials outwardly from the conveyor.

9. A method in accordance with claim 1 wherein the separation step is performed with screens having a plurality of apertures.

10. A method for separating mechanically joined aluminum alloys contained in solid articles, the alloys each having different electrical conductivity values, said method comprising:

a. shredding the solid articles to provide a feedstock of metallic particles wherein the particles include at least one of the alloys;

b. separating from the feedstock in a first separation step a first group of metallic particles having a predetermined particle size;

c. separating from the first group of metallic particles a plurality of second groups of metallic particles, each second group of particles having a predetermined different range of bulk density and a concentration of aluminum alloys different from the concentration in the feedstock;

d. subjecting at least one of the separated second groups of particles of predetermined range of bulk density having an increased concentration of a desired aluminum alloy to a magnetic field of a linear induction motor to displace the particles linearly from a starting point a distance dependent upon the mass of the particles and upon the electrical conductivities of the materials in the particles; and e. collecting a plurality of groups of the displaced particles based upon their displacement from the starting point to provide at least one group of particles having a concentration of the desired alloy greater than the concentration of the desired alloy present in the solid articles.

11. A method in accordance with claim 10 including the step of flattening the separated particles before subjecting them to the magnetic field.

12. A method in accordance with claim 10 including the step of magnetically separating magnetically susceptible materials before the particle separation step.

13. A method in accordance with claim 10 wherein the separating step includes physically screening the feedstock particles to classify the particles into a plurality of particle sized groups.

14. A method in accordance with claim 13 including the step of selecting a particle size group and the further step of gravimetrically performing a further separation of the particles in the selected particle size group to provide a plurality of particle size fractions.

15. A method in accordance with claim 14 wherein the gravimetric separation step includes providing a fluidized bed into which the selected particle size group is introduced.

16. Apparatus for separating mechanically joined aluminum alloys contained in solid articles, the alloys each having different electrical conductivity values, said apparatus comprising:

a. shredding means for reducing the sizes of the solid articles to provide a feedstock of reduced size metallic particles wherein the particles include at least one of the alloys;

b. first separating means for separating from the feedstock a group of metallic particles having a predetermined particle size;

c. separation means for gravimetically performing a further separation of the particles in the group of particles having a predetermined particle size to thereby provide a plurality of fractions having a predetermined range of bulk density, at least one of the fractions having a concentration of a selected one of the alloys greater than the concentration of the selected alloy in the feedstock;

d. displacing means for subjecting the particles in said at least one of the fractions to a magnetic field of a linear induction motor to displace the particles linearly from a starting point a distance dependent upon the mass of the particles and upon the electrical conductivities of the materials in the particles; and e. collecting means for collecting a plurality of groups of the displaced particles based upon their displacement from the starting point to provide groups of particles having different concentrations of the aluminum alloys present in the solid articles, at least one of said groups having a concentration of the selected one of the alloys greater than the concentration of the selected alloy in said at least one of the fractions.

17. Apparatus in accordance with claim 16 including flattening means for flattening the separated particles before subjecting them to the magnetic field.

18. Apparatus in accordance with claim 16 including second separating means for magnetically separating magnetically susceptible materials from the feedstock of metallic particles.

19. Apparatus in accordance with claim 16 wherein the first separating means includes means for physically screening the feedstock particles for classifying the particles into a plurality of particle sized groups.

20. Apparatus in accordance with claim 19 including third separation means for gravimetically performing a further separation of the particles in the selected particle size group to provide a plurality of particle size fractions.

21. Apparatus in accordance with claim 20 wherein the third separating means includes a fluidized bed into which the selected particle size group is introduced.

* * * * *